United States Patent
Lo

(10) Patent No.: US 10,177,983 B1
(45) Date of Patent: *Jan. 8, 2019

(54) AUTO-NEGOTIATION OVER A SINGLE TWISTED WIRE PAIR

(71) Applicant: MARVELL INTERNATIONAL LTD., Hamilton (BM)

(72) Inventor: William Lo, Cupertino, CA (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,534

(22) Filed: Feb. 5, 2018

Related U.S. Application Data

(63) Continuation of application No. 14/590,361, filed on Jan. 6, 2015, now Pat. No. 9,887,880.

(60) Provisional application No. 62/030,880, filed on Jul. 30, 2014, provisional application No. 62/023,592, filed on Jul. 11, 2014, provisional application No. 61/924,124, filed on Jan. 6, 2014, provisional application No. 61/924,126, filed on Jan. 6, 2014.

(51) Int. Cl.
*H04L 12/24* (2006.01)
*H04L 5/16* (2006.01)

(52) U.S. Cl.
CPC ........... *H04L 41/0886* (2013.01); *H04L 5/16* (2013.01); *H04L 41/0866* (2013.01)

(58) Field of Classification Search
CPC .... H04L 41/0886; H04L 5/16; H04L 41/0866
See application file for complete search history.

(56) References Cited

U.S. PATENT DOCUMENTS

| | | | |
|---|---|---|---|
| 4,594,707 A | 6/1986 | Merritt et al. | |
| 5,799,041 A | 8/1998 | Szkopek et al. | |
| 6,169,729 B1* | 1/2001 | Feuerstraeter | H04L 49/351 370/296 |
| 6,215,816 B1* | 4/2001 | Gillespie | H04L 12/44 370/402 |
| 6,876,696 B1 | 4/2005 | Goodson et al. | |
| 6,975,637 B1 | 12/2005 | Lenell | |
| 7,161,911 B1* | 1/2007 | Fang | H04B 1/44 370/282 |
| 7,751,350 B1 | 7/2010 | Pabst | |
| 7,778,313 B2 | 8/2010 | Agazzi | |
| 9,887,880 B1* | 2/2018 | Lo | H04L 41/0886 |
| 2001/0038674 A1 | 11/2001 | Trans | |
| 2006/0077995 A1 | 4/2006 | Lenell | |
| 2006/0098683 A1* | 5/2006 | Thaler | H04L 5/1438 370/462 |
| 2012/0026922 A1* | 2/2012 | Diab | H04L 1/0001 370/296 |

* cited by examiner

*Primary Examiner* — Mohammad S Anwar

(57) ABSTRACT

Systems, methods, and other embodiments associated with a method for performing auto-negotiation using a single conductive path are described. In one embodiment, a method includes performing, with a first device, auto-negotiation in half duplex mode with a second device by way of a single conductive path. The single conductive path connects the first device to the second device.

18 Claims, 8 Drawing Sheets

Differential Manchester Encoding

AUTO-NEGOTIATION OVER A SINGLE TWISTED WIRE PAIR

CROSS REFERENCE TO RELATED APPLICATIONS

This patent disclosure is a continuation of U.S. Non-Provisional application Ser. No. 14/590,361 filed on Jan. 6, 2015 and claims the benefit of U.S. Provisional Application Ser. No. 61/924,124 filed on Jan. 6, 2014, entitled "Half Duplex Differential Manchester Encoding Auto-Negotiation Detailed Proposal;" U.S. Provisional Application Ser. No. 61/924,126 filed on Jan. 6, 2014, entitled "Fast Auto-Negotiation Over Single Pair Cable;" U.S. Provisional Application Ser. No. 62/023,592 filed on Jul. 11, 2014, entitled "Auto-Negotiation on Single Twisted Pair State Machines" and U.S. Provisional Application Ser. No. 62/030,880 filed on Jul. 30, 2014, entitled "Single Pair Auto Negotiation Enhancements," which are incorporated herein by reference.

BACKGROUND

Auto-negotiation is the conventional term used for a technique according to which devices at each end of a link 'advertise' their technical abilities, such as the rate or rates at which the devices can operate. Auto-negotiation is used to perform an arbitration process that establishes the common modes (e.g., full duplex or half duplex) that exist between the two devices and allows the devices to resolve to a single mode of operation using a predetermined priority resolution function. During auto-negotiation, the devices establish a data rate and start time for beginning communication as well as determining which device will act as master and which device will act as slave during the communication between the two devices.

Auto-negotiation is performed by the PHY layer of a device before the PHY commits to powering up in a specific operating mode. Traditionally, the mechanism for auto-negotiation has been to pass information encapsulated within a burst of closely spaced link integrity test pulses, commonly called fast link pulses when auto-negotiation is performed according to IEEE Standard 802.3. Various standards for auto-negotiation specify various state machines or their equivalent that will generate, transmit, and receive the relevant link pulses. The state machines have access to various registers that contain coded signals identifying the technological abilities of the relevant device as well as the technological abilities or possible modes of operation of the link partner device at the other end of the link (e.g., cable), as determined by an examination of received link pulses. During auto-negotiation, pages are transmitted that include coded signals within the aforementioned link pulses. These pages (which are referred to herein as "auto-negotiation pages") include a 'Base Page' of which the prescribed fields indicate the various technological abilities of the relevant device.

SUMMARY OF THE INVENTION

In general, in one aspect this specification discloses a first device that performs auto-negotiation using a single conductive path. The first device includes auto-negotiation logic configured to perform auto-negotiation with a second device in half duplex mode over a single conductive path. The single conductive path connects the first device to the second device.

In one embodiment, the auto-negotiation logic is configured to encode auto-negotiation pages that communicate information about an operating parameter of the first device for transmission to the second device and decode auto-negotiation pages received from the second device that communicate information about an operating parameter of the second device. The auto-negotiation logic is configured to control a transmitter to transmit auto-negotiation pages and control a receiver to receive auto-negotiation pages. The auto-negotiation pages are communicated in half duplex mode by way of the single conductive path to the second device.

In one embodiment, communication with the second device by way of the single conductive path is accomplished by the first device operating sequentially in a selected one of the following states: (i) a wait state in which the transmitter is disabled and the receiver is enabled for receiving an auto-negotiation page, wherein the wait state has a fixed time duration corresponding to a wait period; (ii) a transmit state in which the first device is transmitting an auto-negotiation page; (iii) a blind state in which the first device does not process any received signals; and (iv) receive state in which the first device is enabled for receiving an auto-negotiation page.

In general, in another aspect, this specification discloses a method for performing auto-negotiation using a single conductive path. The method includes performing, with a first device, auto-negotiation in half duplex mode with a second device by way of a single conductive path. The single conductive path connects the first device to the second device.

In general, in another aspect, this specification discloses a method for encoding an auto-negotiation page. The method includes with a first device, encoding, as a sequence of bits, an auto-negotiation page for transmission to a second device connected to the first device by a communication link, wherein the sequence of bits includes sub-sequences of bits corresponding to: (i) information about the first device's operating parameters; (ii) a leading delimiter immediately precedent to the information; and (iii) a following delimiter immediately subsequent to the information. The method also includes transmitting the auto-negotiation page to the second device, and transmitting a null signal immediately after the following delimiter, wherein the null signal has a duration that lasts until transmission of a leading delimiter for a subsequent auto-negotiation page.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
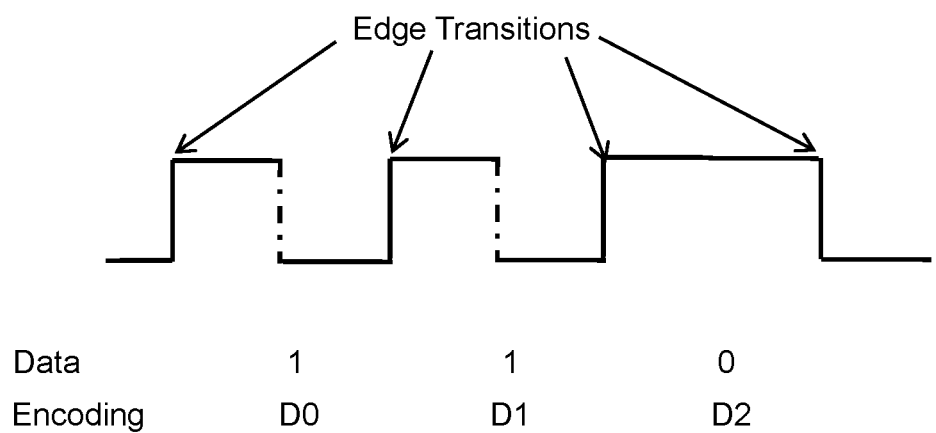
FIG. 1 illustrates Differential Manchester Encoding (DME).

IEEE 802.3 clause 73 was developed for use in auto-negotiation for a backplane using two uni-directional channels. Instead of the traditional link pulses, clause 73 uses Differential Manchester Encoding (DME) to encode the information contained in the auto-negotiation pages exchanged by devices participating in the auto-negotiation process. FIG. 1 illustrates how DME encodes information. In DME, every bit position is bounded by two edge transitions encapsulating a fixed time interval that includes two clock transitions.

Clause 73 does not specify clock periods, however, in one embodiment, the time between clock transitions is 40 nanoseconds, meaning that a bit is transmitted every 80 nanoseconds. If a transition occurs during the time interval, the bit is interpreted as a "1" (e.g., see bits D0 and D1). If no transition occurs, the bit is interpreted as a "0" (e.g., see bit D2). A DME auto-negotiation page includes 48 data bits and one random bit that is used to change the polarity of the page to balance the DC effects of transmitting the DME auto-negotiation pages. As will be seen in FIG. 3, each DME auto-negotiation page is separated from an adjacent page by a delimiter. The delimiter is a sequence of data that does not include the expected edge transitions and thus violates the DME rules.

The DME page defined in clause 73 is optimized for use with a two uni-directional communication channels (e.g., full duplex communication using two backplane channels). However, in many industries, the number of physical channels (e.g., twisted pair wires) is being reduced in an effort to save hardware cost and reduce weight. This means that two uni-directional communication channels may not be available in many applications that could benefit from auto-negotiation.

Described herein are examples of systems, methods, and other embodiments associated with performing auto-negotiation in a single conductive path. For the purposes of this description, a single conductive path is a single physical electrical path capable of conducting signals from one device at a time as opposed to parallel electrical paths that can conduct respective signals simultaneously on respective parallel paths. One example of a conductive path is a single twisted wire pair also called a "twisted pair cable". Two twisted wire pairs are not a "single conductive path", but rather would correspond to two conductive paths.

One way of enabling auto-negotiation on a communication channel or single twisted wire pair is by enabling half duplex auto-negotiation using DME pages similar to those defined in IEEE 802.3 clause 73. The described embodiments include DME pages that are adapted for half duplex communication as well as a devices and systems that operate according to an auto-negotiation state machine that performs half duplex DME page based auto-negotiation. Other ways of enabling auto-negotiation over a single twisted wire pair is to employ full duplex communication and include cancellation circuits.

Figure 2:
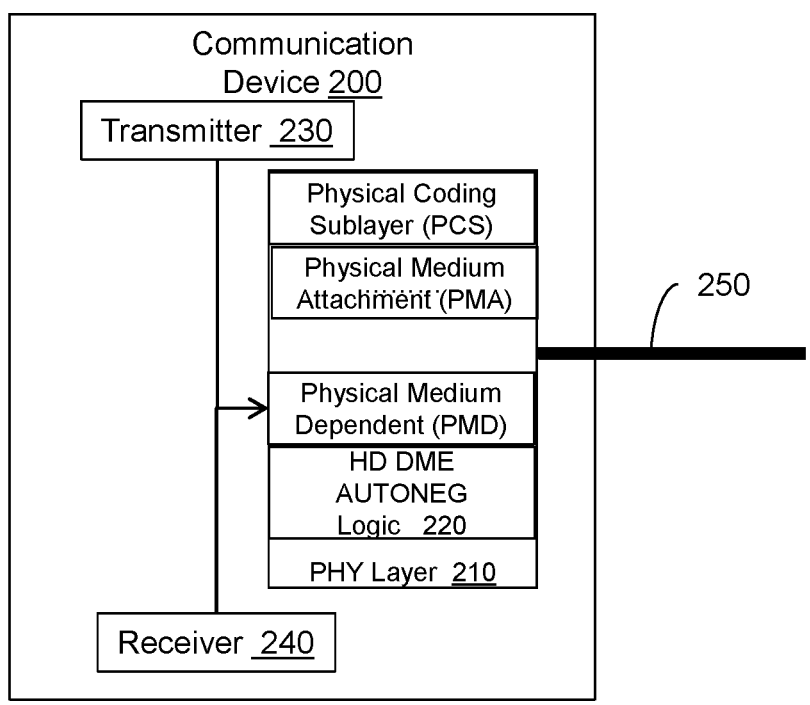
FIG. 2 illustrates one embodiment of a communication device that performs half duplex DME auto-negotiation.

With reference to FIG. 2, one embodiment of a communication device 200 is shown that is associated with half duplex DME auto-negotiation. In one embodiment, the communication device 200 is implemented on a chip including one or more integrated circuits configured to perform one or more of the functions described herein. The communication device 200 includes the layers defined in IEEE 802.3 that are typically associated with a network communication device. Hardware associated with a PHY layer 210 of the communication device 200 is illustrated along with PCS, PMA, and PMD sublayers to provide context, other additional PHY sublayers may be present. The PHY layer 210 is connected to a communication link 250 which defines a single communication channel and comprises physical medium used to carry signals. In various embodiments, the communication link 250 may be a cable, a twisted pair wire, and so on. The PHY layer 210 provides the interface through which a transmitter 230 and a receiver 240 respectively send and receive signals on the communication link 250. The PHY layer 210 includes a sublayer corresponding to a half duplex DME auto-negotiation logic 220 that performs half duplex DME auto-negotiation with one or more link partners connected to the communication device 200 via the communication link 250.

Figure 3:
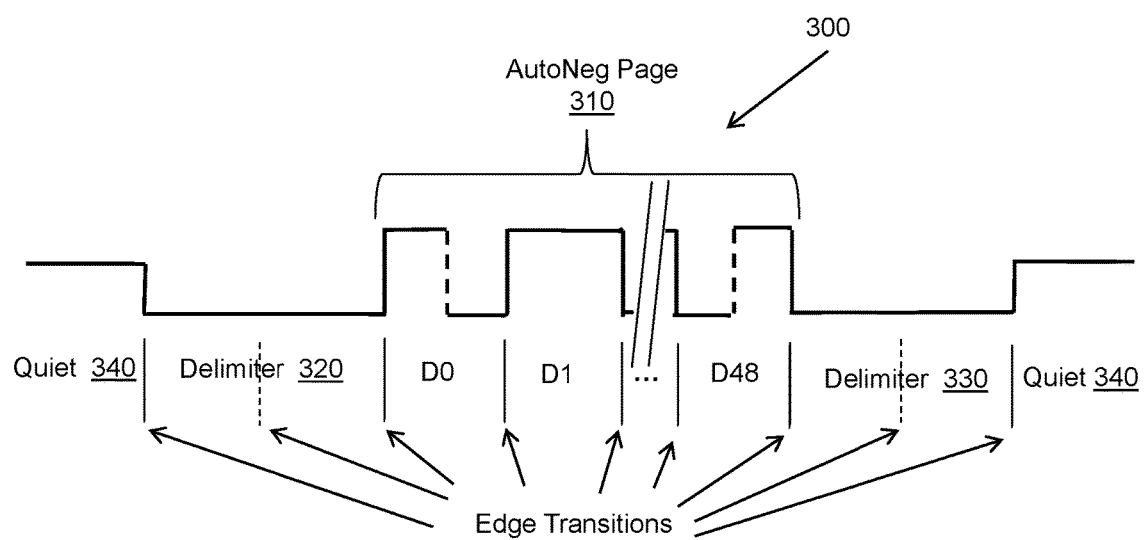
FIG. 3 illustrates one embodiment of sequence of signals that encode an auto-negotiation page for transmission using half duplex communication.

FIG. 3 illustrates one example of a sequence of signals 300 that are used by the auto-negotiation logic 220 (FIG. 2) to communicate a single half duplex DME auto-negotiation page 310 to a link partner. The edge transitions used in DME to define bit positions are indicated as hash marks between the various bits in the sequence of signals 300. As shown in FIG. 3, the auto-negotiation page 310 includes 49 bits as prescribed by clause 73, and one of the 49 bits is randomly generated and is used to invert the polarity of the auto-negotiation page 310. In other embodiments, any number of bits could be included in the auto-negotiation page 310. In one embodiment, the half duplex DME auto-negotiation logic 220 generates a random number and either inverts or does not invert the polarity of an auto-negotiation page based on the random number. In this embodiment, the random bit does not need to be included in an auto-negotiation page being transmitted, as the half duplex DME auto-negotiation logic 220 can simply transmit an auto-negotiation page with the appropriate polarity.

The auto-negotiation page 310 is bracketed between a leading delimiter 320 and a following delimiter 330. Note that the delimiters 320, 330 are missing an expected edge transition (in dashed lines), which will cause the sequence of bits in the delimiters to violate the established rules of DME. Sequences that are missing an edge transition, or violate the DME rules in any other predetermined manner, are interpreted as corresponding to a delimiter. In one embodiment, a predetermined pattern or patterns can be used to communicate a delimiter. In one embodiment, a series of a predetermined number of delimiter sequences is inserted before and after the auto-negotiation page 310. In one embodiment, the delimiters 320, 330 have the same format, in other embodiments, the leading delimiter and the following delimiter have a different format (e.g., opposite polarity, a different number of delimiters in the leading series of delimiters and the following series of delimiters, and so on).

Clause 73 specifies that auto-negotiation pages be continuously transmitted and separated by a single delimiter. In contrast, the sequence of signals 300 shown in FIG. 3 includes bits corresponding to a quiet period 340 that is transmitted immediately prior to the leading delimiter 320 and immediately after the following delimiter 330. The bits in the quiet period 340 correspond to a null signal that is neither 1 nor 0, differentiating the quiet period bits from the rest of the sequence of bits that communicate the auto-negotiation page 310. The quiet period 340 between auto-negotiation pages allows time for the pages to propagate to the link partner and for pages to be received from the link partner in half duplex communication as will be described in more detail below.

Figure 4:
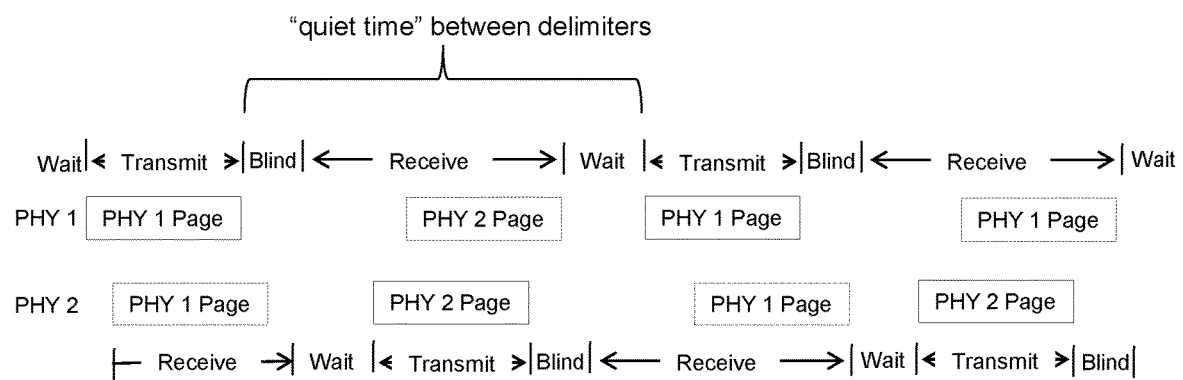
FIG. 4 illustrates a sequence of operation of two devices performing one embodiment of half duplex DME auto-negotiation.
Figure 5:
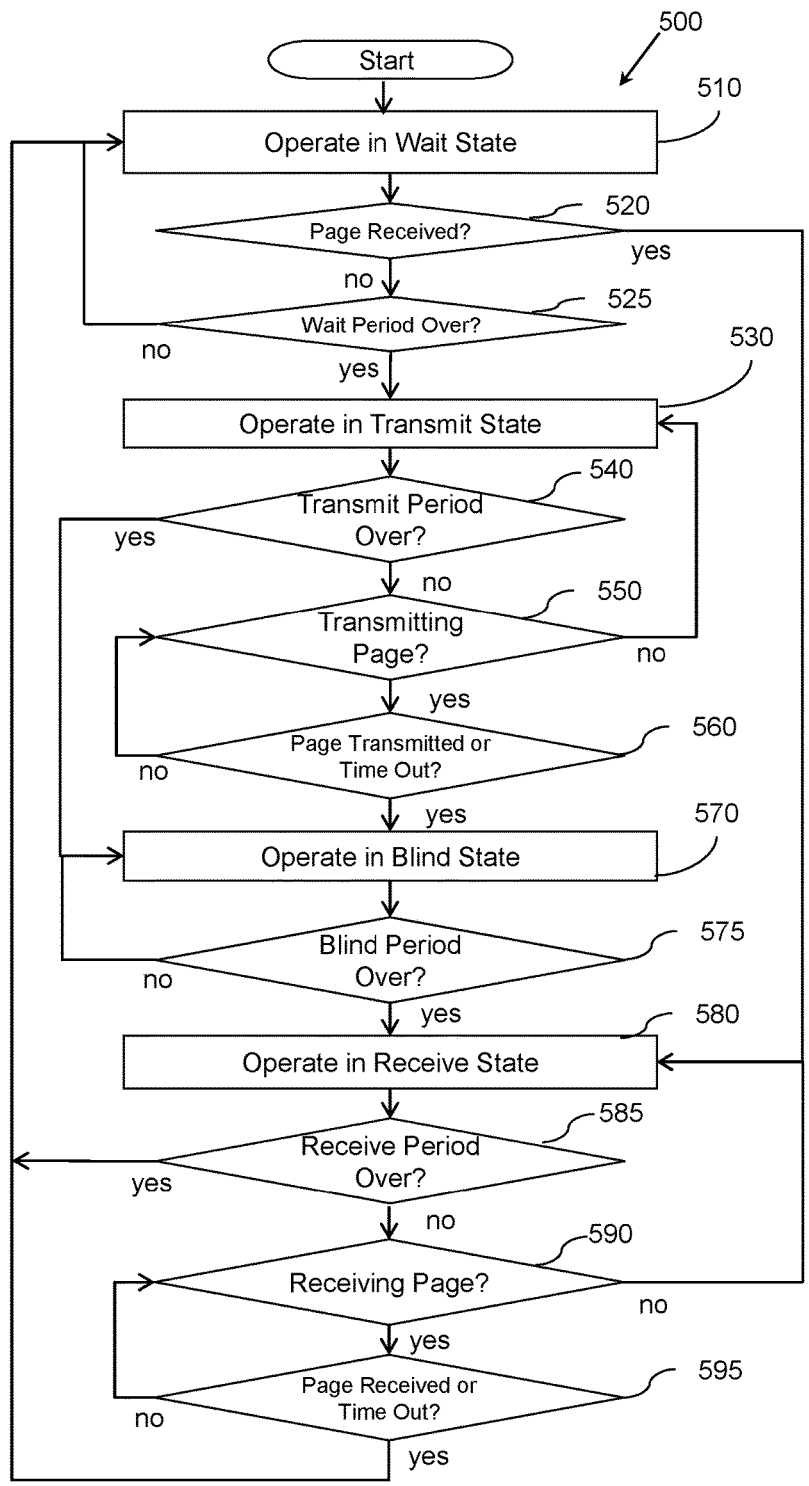
FIG. 5 illustrates one embodiment of a method of performing half duplex DME auto-negotiation.

FIGS. 4 and 5 illustrate a sequence of operation in which devices participate during half duplex DME auto-negotiation. During auto-negotiation, the devices operate according to various state machines that include an arbitration state machine, a transmit state machine, a receive state machine, and a half-duplex state machine. U.S. Provisional Patent Application Ser. No. 62/023,592 filed on Jul. 11, 2014, entitled "Auto-Negotiation on Single Twisted Pair State Machines", to which the present application claims priority, provides state diagrams and a detailed explanation of these state machines. Reference to this Provisional patent application should be made to learn details of one particular embodiment of the state machines. FIGS. 4 and 5 provide a general overview of various aspects of the state machines that are germane to half duplex DME auto-negotiation.

To accomplish half duplex DME auto-negotiation, the devices cycle sequentially between wait, transmit, blind, and receive states. FIG. 4 illustrates transmission of auto-negotiation pages (also referred to herein as "pages") between PHY 1 (e.g., the PHY layer of a first device) and PHY 2 (e.g., the PHY layer of a second link device). The states in which PHY 1 is operating are shown above the sequence of pages for PHY 1 and the states for PHY 2 are shown below the sequence of pages for PHY 2. Pages that are being transmitted have a solid outline while pages that are being received have a dashed outline.

Before exchange of auto-negotiation pages begins, both devices are in the wait state. In the wait state, the device is not transmitting a page and is not expecting a page, but can receive a page. The wait state is used to avoid collisions as each device waits to the end of its wait state before transmitting a page. If a page is received while the device is in the wait state, the device transitions into the receive state and will not transmit a page that would collide with a page being received.

After PHY 1's wait state expires, PHY 1 enters the transmit state and transmits a first PHY 1 page. After a propagation delay, PHY 2 enters the receive state upon receiving the first PHY 1 page. After transmitting the first PHY 1 page, PHY 1 enters the blind state. In the blind state a PHY ignores (e.g., does not process) signals that are received. Entering the blind state allows a PHY to ignore echo signals that are reflections of the transmitted page on the communication link. The blind state has a fixed duration that is set based on the length of the communication link (e.g., worst case round trip time for echo propagation). By way of example, for a 200 meter twisted pair cable, a blind state lasting 2000 nanoseconds should be sufficient in most cases.

After PHY 2 has received the first PHY 1 page, PHY 2 enters the wait state in which PHY 2 will refrain from transmitting pages. In one embodiment, the wait state has a fixed time duration that is selected to be slightly longer than the duration of the blind period. This is to ensure that a link partner is not in the blind state when a link partner transmits a page. Meanwhile, upon expiration of PHY 1's blind period, PHY 1 enters the receive state in which it is capable of receiving a page.

When PHY 2's wait period expires, PHY 2 enters the transmit state and transmits a first PHY 2 page to PHY 1, which is now in the receive state and ready to receive the first PHY 2 page. After transmitting the first PHY 2 page, PHY 2 enters the blind state so that PHY 2 can ignore reflections of the first PHY 2 page on the communication link. After receiving the first PHY 2 page, PHY 1 enters the wait state to allow PHY 2's blind state to expire prior to entering the transmit state to transmit a second PHY 1 page. PHY 2's blind state having expired, PHY 2 is in the receive state and ready to receive the second PHY 1 page. This cycling between the wait, transmit, blind, and receive states continues until a predetermined number of pages has been successfully communicated or an auto-negotiation time limit expires.

Recall from FIG. 3 that the sequence of bits 300 used to communicate an auto-negotiation page 310 includes the quiet period 340 in which a null signal corresponding to neither 1's nor 0's is transmitted. It is during this quiet period that the device that transmits the auto-negotiation page is in the blind, receive, and wait states. The null signal is selected such that the null signal will not interfere with signals being received from a link partner. Each device's PHY can be configured to compensate for the null signal when interpreting received signals. The quiet period of PHY 1's transmission of its auto-negotiation pages is illustrated by the brackets in FIG. 4.

Turning now to FIG. 5, one embodiment of a method 500 for performing half duplex DME auto-negotiation is shown. The method 500 corresponds to a general overview of interacting portions of the half-duplex, transmit, and receive state machines. The method 500 may be performed by the half duplex DME logic 220 of FIG. 2 when a first auto-negotiation page is ready to be transmitted to a link partner. The half duplex DME logic 220 can control other PHY layers associated with transmitting and receiving signals to perform the method 500.

The method begins at 510 in which a first device is in the wait state. In the wait state, the first device is refraining for the predetermined wait period from transmitting a page to avoid collisions with pages transmitted by a second device (e.g., a link partner). The first device is capable of receiving a page while in the wait state. The first device remains in the wait state at 510 until either a page is received at 520 or the predetermined wait period expires at 525. If a page is received while the first device is in the wait state, at 520 the first device transitions to the receive state at 580, and the method continues as will be described below.

Once the wait period has expired, at 525 the first device transitions to operate in the transmit state at 530. In the transmit state, the first device can transmit pages and cannot receive pages. The first device remains in the transmit state until a predetermined transmit period expires at 540 or a page that is being transmitted at 550 is successfully or unsuccessfully transmitted at 560.

Upon exiting the transmit state, the first device enters the blind state 570 in which the first device ignores received signals until the predetermined blind period expires at 575. After the blind period has expired, the first device enters the receive state 580 in which the first device is enabled for receiving a page from the link partner. In the receive state, the first device can receive pages and cannot transmit pages. The first device remains in the receive state until a predetermined receive period expires at 585 or a page that is being received at 590 is successfully or unsuccessfully transmitted at 595.

By operating in the sequence of states outlined in FIGS. 4 and 5, a first and second device can successfully perform auto-negotiation using half duplex communication of DME auto-negotiation pages. For the purposes of this description, half duplex communication means communication in which at any given time only one device is transmitting and only one device is receiving. In other words, simultaneous transmission by both the first and second devices is not permitted and simultaneous reception by both the first and second devices is not permitted.

Figure 6:
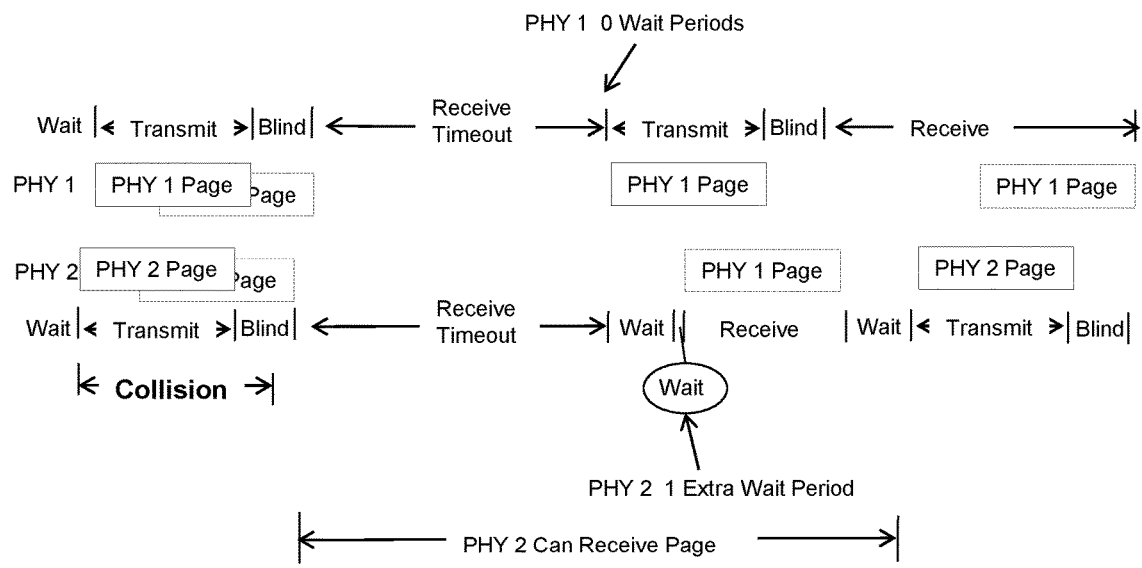
FIG. 6 illustrates a sequence of operation of two devices performing one embodiment of half duplex DME auto-negotiation with collision resolution features.
Figure 7:
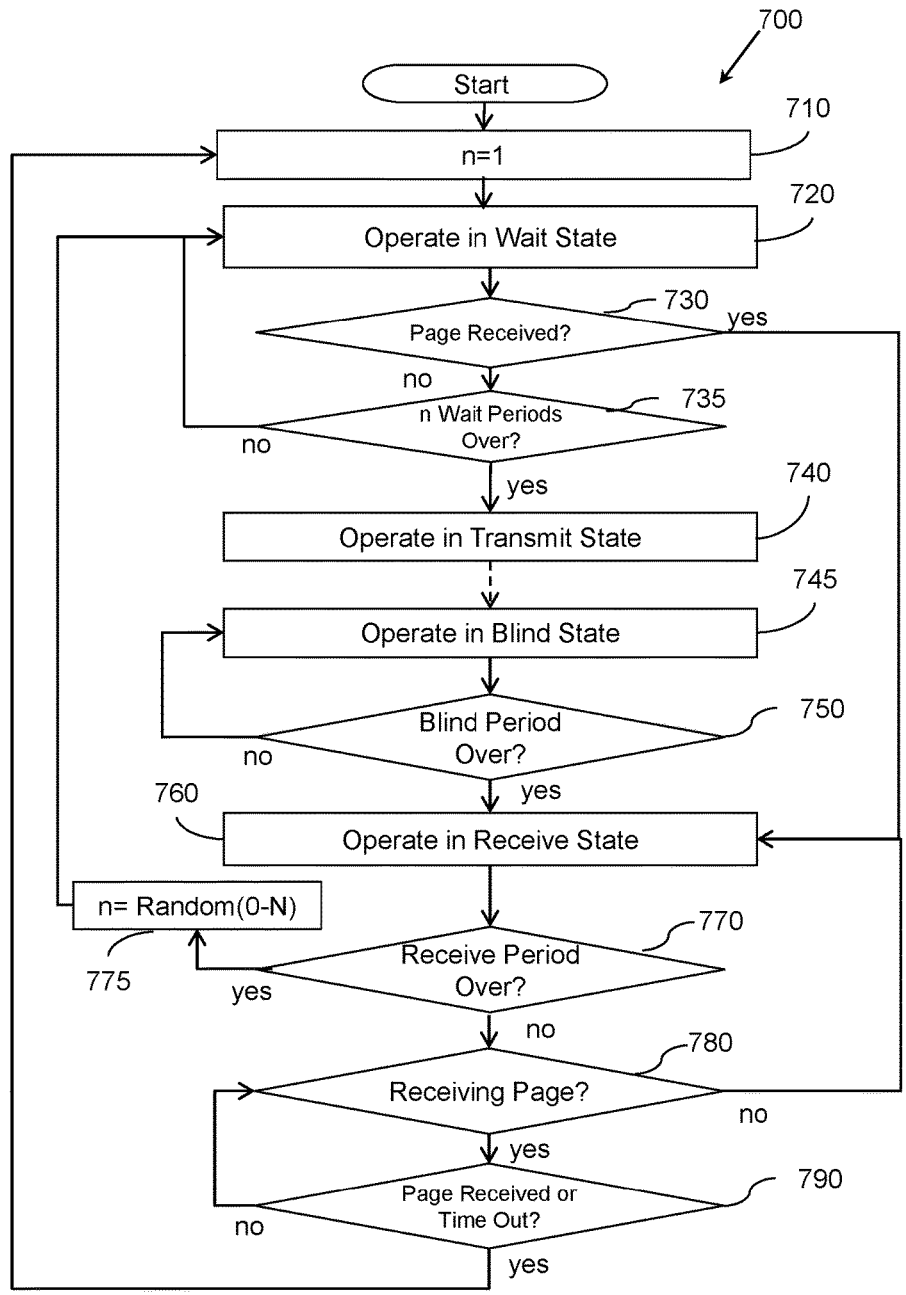
FIG. 7 illustrates one embodiment of a method of resolving a collision occurring during half duplex DME auto-negotiation.

FIGS. 6 and 7 illustrate one embodiment of an anti-collision feature that prevents collisions while performing half duplex DME auto-negotiation. Referring first to FIG. 6, a scenario is illustrated in which PHY 2's initial wait period (e.g., the wait period before any auto-negotiation pages are exchanged) expires just prior to PHY 1's initial wait period. PHY 2 enters the transmit state first and transmits a first PHY 2 page. After PHY 1's wait period expires and prior to receiving the first PHY 2 page, PHY 1 enters the transmit state and transmits a first PHY 1 page. The pages collide because the pages reach each PHY when the PHY is in the transmit state and cannot receive pages and the PHYs are unaware that a collision has occurred.

After transmitting the pages, each PHY enters the blind state. The blind state of PHY 1 is closely aligned chronologically with the blind state of PHY 2. When the blind periods expire each PHY enters the receive state. Because PHY 1 is in the receive state PHY 1 will not transmit a page to PHY 2 and PHY 2's receive state will timeout without receiving a page. Likewise, because PHY 2 is in the receive state, PHY 2 will not transmit a page to PHY 1 and PHY 1's receive state will timeout without receiving a page. If, at this point, both PHY 1 and PHY 2 wait for a single wait period before transmitting a next page, the collision would occur again.

To avoid a subsequent collision, the receive and transmit state machines are adapted so that in the event that a device's receive state times out without receiving a page, the device will wait some number of wait periods before transmitting a subsequent page. The number can be a random number between 0 and N, with N selected to balance the length of wait with the probability of a subsequent collision. In the illustration of FIG. 6, PHY 1 waits 0 wait periods before entering the transmit state and PHY 2 waits 2 wait periods. Because the propagation delay between PHY 1 and PHY 2 is greater than the wait period, while PHY 2 is in its second wait period of the extended wait state, PHY 1 transmits, and PHY 2 successfully receives, a second PHY 1 page. Upon receiving the second PHY 1 page, PHY 2 enters the receive state and the devices are aligned for half duplex DME auto-negotiation.

Turning now to FIG. 7, one embodiment of a method 700 for performing half duplex DME auto-negotiation is shown. The method 700 corresponds to a general overview of an adaptation of the interacting portions of the half-duplex, transmit, and receive state machines illustrated in method 500. A more detailed explanation of the state machines as adapted for collision resolution can be found in U.S. Provisional Application Ser. No. 62/030,880 filed on Jul. 30, 2014, entitled "Single Pair Auto Negotiation Enhancements," to which the present application claims priority. The method 700 may be performed by the half duplex DME logic 220 of FIG. 2 when a first auto-negotiation page is ready to be transmitted to a link partner. The half duplex DME logic 220 can control other PHY layers associated with transmitting and receiving signals to perform the method 700.

The method 700 begins at 710 in which a number n is set to 1. The number n defines the number of wait periods that a first device will wait prior to transmitting its next page. At 720, the first device is in the wait state. In the wait state, the first device is refraining from transmitting a page for the number n of wait periods to avoid collisions with pages transmitted by a second device (e.g., a link partner). The first device is capable of receiving a page while in the wait state. The first device remains in the wait state at 720 until either a page is received at 730 or the number n of wait periods expires at 735. If a page is received while the first device is in the wait state, at 730 the first device transitions to the receive state at 760, and the method continues as will be described below.

Once the number n wait periods have expired, at 735 the first device transitions to operate in the transmit state at 740 and the blind state at 750. The transmit state 740 and the blind state 750 proceeds as described with respect to the transmit state 530 and the blind state 570 of FIG. 5. After the blind period has expired, the first device enters the receive state 760 in which the first device is enabled for receiving a page from the link partner. In the receive state, the first device can receive pages and cannot transmit pages. The first device remains in the receive state until a predetermined receive period expires at 770 or a page that is being received at 780 is successfully or unsuccessfully transmitted at 790. If the receive state times out at 770, at 775 a random number between 0 and N is selected and the number n is assigned the selected value. The method returns to 720 in which the first device will wait the number n wait periods prior to transmitting a page. If a subsequent collision occurs, a different random number will be assigned to n and the method 700 repeats until the devices align for half duplex communication.

In one embodiment, the time required to resolve a collision is improved by specifying that a device that prefers to be slave change the number n to a number greater than 1 while a device that is forced master or prefers to be master maintains a single wait period in the event of collision. A master can always use an even number n while a slave uses an odd number n. A slave can add a half wait period to the number n, and so on. Alternatively, a device that is forced slave can be configured to never transmit until after receiving an auto-negotiation page.

By operating in the sequence of states outlined in FIGS. 4-7, devices can successfully perform auto-negotiation using half duplex communication of DME auto-negotiation pages and more quickly resolve any collisions that may occur.

Figure 8:
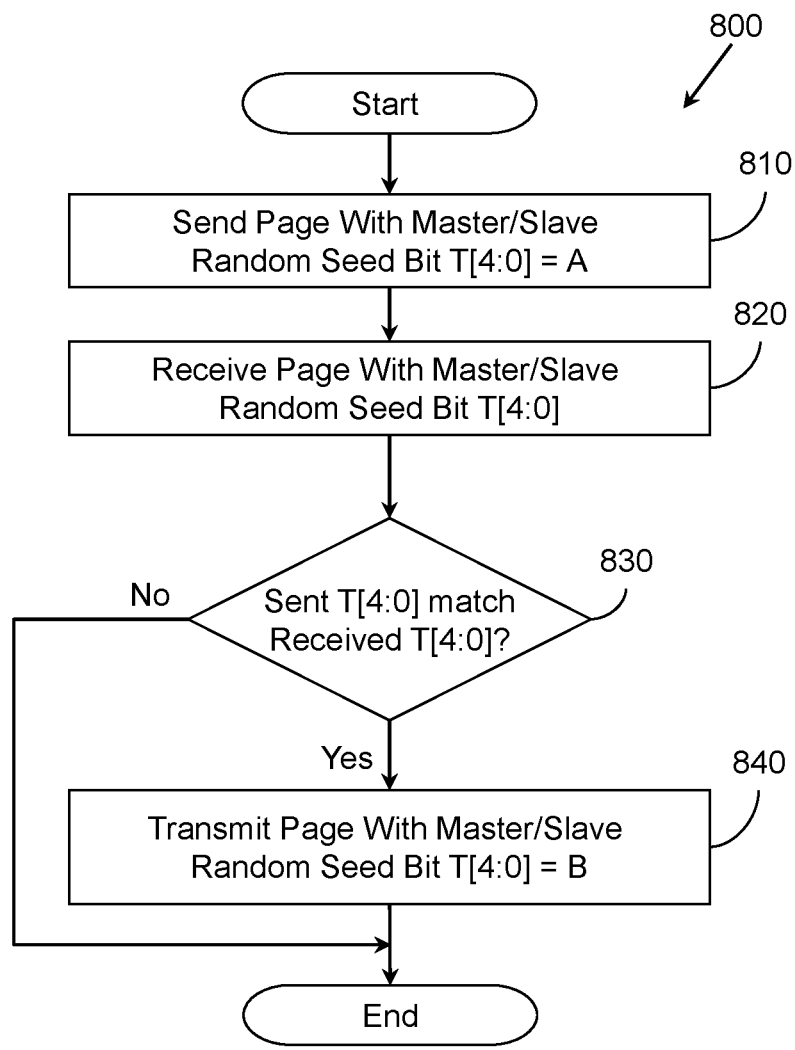
FIG. 8 illustrates one embodiment of a method of performing half duplex DME auto-negotiation with enhanced master/slave conflict resolution.

A further enhancement that can be made to clause 73 auto-negotiation performed using half duplex communication enables more quickly resolving which device will be master and which device will be slave. One embodiment of a method 800 that performs the master/slave resolution enhancement is illustrated in FIG. 8. The DME auto-negotiation page includes a master/slave random seed bit, which in one embodiment occupies position T[4:0] of the page as defined in clause 73. Clause 73 specifies that when both devices communicate by way of the auto-negotiation page that they want to both be master or both be slave, the device whose page has a higher master/slave random seed bit will be master. If the master/slave random seed bits happen to match, then a restart is forced.

In the method 800 at 810 a first device sends a page with the master/slave random seed bit set to A. At 820 a page is received, by the first device, with the master/slave random seed bit set to B. At 830 a determination is made as to whether A=B, meaning the master/slave random seed bits match. If the master/slave random seed bits match, rather than sending the same page another time, as would occur under present clause 73, at 840 the method includes generating a different value (e.g., inverting the bit) prior to the first device sending the next page. In this manner, the master/slave random seed bit will not match in the next iteration and the master slave matter is resolved quickly. Since the system is half duplex, there is a good chance that the other device (e.g., the link partner) did not receive the first page with the matching master/slave random seed bit value, so changing the value will not cause an error to occur.

As can be seen from the foregoing description, half duplex DME auto-negotiation is enabled by utilizing a quiet period between auto-negotiation page delimiters and by employing a state machine that cycles sequentially between wait, transmit, blind, and receive states.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

What is claimed is:

1. A first device, comprising:
    a transmitter that transmits, during an auto-negotiation process involving a second device, a first set of auto-negotiation pages to the second device over a single physical electrical path connecting the first device and the second device, wherein the first set of auto-negotiation pages comprises first pages that convey information about an operating parameter of the first device;
    a receiver that receives a second set of auto-negotiation pages transmitted by the second device over the single physical electrical path during the auto-negotiation process, wherein the second set of auto-negotiation pages comprises second pages that convey information about an operating parameter of the second device; and
    auto-negotiation logic configured to control operation of the transmitter to perform the auto-negotiation process in half duplex mode over the single physical electrical path, wherein the auto-negotiation logic activates the transmitter to transmit the first pages at times that avoid collisions between the first pages and the second pages along the single physical electrical path during the auto-negotiation process.

2. The first device of claim 1, wherein:
    the single physical electrical path is capable of conducting one of: (i) the first pages transmitted by the transmitter, or (ii) the second pages transmitted by the second device, at a time during the auto-negotiation process to prevent interference with reception of the second pages by the receiver.

3. The first device of claim 1, wherein the auto-negotiation logic is further configured to:
    (i) encode at least one of the first pages using an encoding standard for performing auto-negotiation in full duplex mode, and
    (ii) identify a start or an end of the at least one of the first pages using a delimiter comprising a bit pattern that violates a rule of the encoding standard.

4. The first device of claim 3, wherein the auto-negotiation logic is configured to insert a null signal corresponding to neither a 1 nor a 0 as the delimiter between consecutively-transmitted first pages.

5. The first device of claim 1, wherein the auto-negotiation logic is configured to sequentially operate the first device in:
(i) a transmit state in which the transmitter transmits at least one of the first pages; and
(ii) a blind state in which the first device does not process signals received by the receiver.

6. The first device of claim 5, wherein:
the blind state has a defined duration that is suitable to allow echo signals resulting from transmission of at least one of the first pages to subside.

7. A method, comprising:
transmitting, during an auto-negotiation process involving a second device, a first set of auto-negotiation pages to the second device over a single physical electrical path connecting the first device and the second device, wherein the first set of auto-negotiation pages comprises first pages that convey information about an operating parameter of the first device;
receiving a second set of auto-negotiation pages transmitted by the second device over the single physical electrical path during the auto-negotiation process, wherein the second set of auto-negotiation pages comprises second pages that convey information about an operating parameter of the second device; and
controlling operation of the transmitter to perform the auto-negotiation process in half duplex mode over the single physical electrical path, wherein controlling operation of the transmitter comprises activating the transmitter to transmit the first pages at times that avoid collisions between the first pages and the second pages along the single physical electrical path during the auto-negotiation process.

8. The method of claim 7, wherein:
transmitting the first set of pages comprises transmitting the first pages over a single conductive path that is capable of conducting one of: (i) the first pages transmitted by the transmitter, or (ii) the second pages transmitted by the second device, at a time during the auto-negotiation process to prevent interference with reception of the second pages by the receiver.

9. The method of claim 7, further comprising:
(i) encoding at least one of the first pages using an encoding standard for performing auto-negotiation in full duplex mode, and
(ii) identifying a start or an end of the at least one of the first pages using a delimiter comprising a bit pattern that violates a rule of the encoding standard.

10. The method of claim 9, wherein identifying the start or the end of at least one of the first pages comprises inserting a null signal corresponding to neither a 1 nor a 0 as the delimiter between consecutively-transmitted first pages.

11. The method of claim 7, further comprising:
operating the first device in a blind state after the transmitter transmits at least one of the first pages, wherein the first device in the blind state does not process signals received by the receiver.

12. The method of claim 11, wherein:
operating the first device in the blind state comprises maintaining operation of the blind state for a defined duration that is suitable to allow echo signals resulting from transmission of at least one of the first pages to subside.

13. An integrated circuit comprising a non-transitory, computer-readable medium storing computer-executable instructions that, when executed by at least one processor of a first device, cause the first device to:
transmit, with a transmitter during an auto-negotiation process involving a second device, a first set of auto-negotiation pages to the second device over a single physical electrical path connecting the first device and the second device, wherein the first set of auto-negotiation pages comprises first pages that convey information about an operating parameter of the first device;
receive a second set of auto-negotiation pages transmitted by the second device over the single physical electrical path during the auto-negotiation process, wherein the second set of auto-negotiation pages comprises second pages that convey information about an operating parameter of the second device; and
operate the transmitter to perform the auto-negotiation process in half duplex mode over the single physical electrical path, wherein the transmitter is activated to transmit the first pages at times that avoid collisions between the first pages and the second pages along the single physical electrical path during the auto-negotiation process.

14. The integrated circuit of claim 13, wherein the instructions, when executed by the at least one processor, cause the first device to:
transmit the first set of pages over a single conductive path that is capable of conducting one of: (i) the first pages transmitted by the transmitter, or (ii) the second pages transmitted by the second device, at a time during the auto-negotiation process to prevent interference with reception of the second pages by the receiver.

15. The integrated circuit of claim 13, further comprising instructions that, when executed by the at least one processor, cause the first device to:
(i) encode at least one of the first pages using an encoding standard for performing auto-negotiation in full duplex mode, and
(ii) identify a start or an end of the at least one of the first pages using a delimiter comprising a bit pattern that violates a rule of the encoding standard.

16. The integrated circuit of claim 15, wherein the start or the end of at least one of the first pages is identified by inserting a null signal corresponding to neither a 1 nor a 0 as the delimiter between consecutively-transmitted first pages.

17. The integrated circuit of claim 13, further comprising instructions that, when executed by the at least one processor, cause the first device to:
operate in a blind state after the transmitter transmits at least one of the first pages, wherein the first device in the blind state does not process signals received by the receiver.

18. The integrated circuit of claim 17, wherein the instructions cause the first device to operate in the blind state for a defined duration that is suitable to allow echo signals along the single physical electrical path resulting from transmission of at least one of the first pages to subside.

* * * * *